(12) United States Patent
Russell et al.

(10) Patent No.: US 11,772,170 B2
(45) Date of Patent: Oct. 3, 2023

(54) HANDLE APPARATUS FOR AN INDUSTRIAL MACHINE TOOL

(71) Applicant: JR Automation Technologies, LLC, Holland, MI (US)

(72) Inventors: Joseph Robert Russell, Jenison, MI (US); Jason R. Turman, Grand Haven, MI (US); Ryan Nathan Anderson, Dayton, OH (US); Marcos Merino, Grand Rapids, MI (US); Gabriel C. Van't Land, Holland, MI (US)

(73) Assignee: JR Automation Technologies, LLC, Holland, MI (US)

( * ) Notice: Subject to any disclaimer, the term of this patent is extended or adjusted under 35 U.S.C. 154(b) by 239 days.

(21) Appl. No.: 17/170,201

(22) Filed: Feb. 8, 2021

(65) Prior Publication Data

US 2021/0245317 A1     Aug. 12, 2021

Related U.S. Application Data

(60) Provisional application No. 63/031,882, filed on May 29, 2020, provisional application No. 62/971,929, filed on Feb. 8, 2020.

(51) Int. Cl.
*B23Q 3/18* (2006.01)
*B23B 31/02* (2006.01)
(Continued)

(52) U.S. Cl.
CPC ............. *B23B 31/028* (2013.01); *B21J 15/14* (2013.01); *B23B 31/1075* (2013.01);
(Continued)

(58) Field of Classification Search
CPC . B23B 31/028; B23B 31/1075; B23B 39/161; B23B 51/107; B23B 35/00;
(Continued)

(56) References Cited

U.S. PATENT DOCUMENTS 3,837,757 A * 9/1974 Levine .................. B23Q 16/00
                                                     408/136
2002/0092156 A1* 7/2002 Pfleghar ............... B25H 1/0028
                                                     29/700

FOREIGN PATENT DOCUMENTS

| CN | 205302078 U | 6/2016 |
| RU | 127336 U1 | 4/2013 |
| SU | 242646 A1 | 4/1969 |

* cited by examiner

*Primary Examiner* — Nirvana Deonauth
(74) *Attorney, Agent, or Firm* — The Watson IP Group, PLC; Jovan N. Jovanovic

(57) ABSTRACT

A handle is coupled to an industrial machine tool, along with a method of operating the industrial machine tool via the handle. The handle comprises a housing, a first switch, and a second switch. The housing includes a first side, a second side, a top end, and a bottom end, the first side facing toward the industrial machine tool and the second side facing away from the industrial machine tool. The first switch actuates a float mode for the industrial machine tool, the float mode being a mode in which movement of a moveable portion of the industrial machine tool is power assisted for an operator of the industrial machine tool. The second switch actuates a machining portion, coupled to the moveable portion of the industrial machine tool, to perform a machining process on a workpiece.

8 Claims, 6 Drawing Sheets

(51) Int. Cl.
*B23B 39/16* (2006.01)
*B23Q 17/00* (2006.01)
*B23Q 17/22* (2006.01)
*B23B 31/107* (2006.01)
*B23B 51/10* (2006.01)
*B21J 15/14* (2006.01)
*B23P 23/04* (2006.01)
*B21J 15/02* (2006.01)
*B21J 15/30* (2006.01)
*B21J 15/32* (2006.01)
*B23B 35/00* (2006.01)
*B23Q 15/007* (2006.01)
*B23Q 16/00* (2006.01)

(52) U.S. Cl.
CPC .......... *B23B 39/161* (2013.01); *B23B 51/107* (2013.01); *B23P 23/04* (2013.01); *B23Q 3/18* (2013.01); *B23Q 3/183* (2013.01); *B23Q 17/006* (2013.01); *B23Q 17/2216* (2013.01); *B21J 15/02* (2013.01); *B21J 15/30* (2013.01); *B21J 15/32* (2013.01); *B23B 35/00* (2013.01); *B23Q 15/0075* (2013.01); *B23Q 16/00* (2013.01)

(58) Field of Classification Search
CPC ... B21J 15/14; B21J 15/02; B21J 15/30; B21J 15/32; B23P 23/04; B23Q 3/18; B23Q 3/183; B23Q 17/006; B23Q 17/2216; B23Q 15/0075; B23Q 16/00
See application file for complete search history.

HANDLE APPARATUS FOR AN INDUSTRIAL MACHINE TOOL

CROSS-REFERENCE TO RELATED APPLICATION

This application claims priority from U.S. Provisional Patent Application Ser. No. 62/971,929 filed on Feb. 8, 2020, entitled "SYSTEM AND METHOD FOR COUPLING FASTENER HARDWARE TO A BRACKET", and claims priority from U.S. Provisional Patent Application Ser. No. 63/031,882 filed on May 29, 2020, entitled "SYSTEM AND METHOD FOR COUPLING FASTENER HARDWARE TO A BRACKET", the entire disclosures of which are hereby incorporated by reference in their entireties.

BACKGROUND OF THE DISCLOSURE

1. Field of the Disclosure

The disclosure relates in general to a handle apparatus, and more particularly, to a handle apparatus for an industrial machine tool.

2. Background Art

Industrial machine tools are machines used for handling or machining various materials, typically metal or other rigid materials. Industrial machine tools can be used for drilling, cutting, riveting, grinding, shearing, and/or other forms of machining of any number of articles of manufacture. Industrial machine tools include some sort type of powered machining portion that performs these actions. This machining portion can include a drill portion, industrial shears, a riveting portion, a grinder portion, etc. While the articles of manufacture are being processed by the industrial machine tools, the articles of manufacture are typically constrained in some manner.

SUMMARY OF THE DISCLOSURE

The disclosure is directed to a handle coupled to an industrial machine tool. The handle comprises a housing, a first switch, and a second switch. The housing includes a first side, a second side, a top end, and a bottom end, the first side facing toward the industrial machine tool and the second side facing away from the industrial machine tool. The first switch actuates a float mode for the industrial machine tool, the float mode being a mode in which movement of a moveable portion of the industrial machine tool is power assisted for an operator of the industrial machine tool. The second switch actuates a machining portion, coupled to the moveable portion of the industrial machine tool, to perform a machining process on a workpiece.

In at least one configuration, a system includes the handle. The system includes the industrial machine tool comprising a servomechanism to power assist in the movement of the moveable portion of the industrial machine tool.

In at least one configuration, a system includes the handle and comprises the industrial machine tool. The industrial machine tool comprises a distance sensor and a processor. The distance sensor senses a distance between the moveable portion of the industrial machine tool and the workpiece. The processor limits the actuation of the machining portion to only when the distance between the moveable portion of the industrial machine tool and the workpiece is less than a threshold value.

In at least one configuration, the distance sensor is a linear variable differential transformer (LVDT).

In at least one configuration, a system is comprised of an industrial drill including the handle and an industrial riveter including the handle, the industrial drill being disposed next to the industrial riveter.

In at least one configuration, the housing comprises a top portion, a bottom portion, and a middle portion. The top portion couples the handle to the industrial machine tool. The bottom portion extends away from the operator and toward the industrial machine tool, the bottom portion providing a support for a bottom of a hand of the operator of the industrial machine tool. The middle portion is disposed substantially vertically between the top portion and the bottom portion, the middle portion being a location on the handle where the operator grasps the handle.

In at least one configuration, wherein locations where the top portion, the middle portion, and the bottom portion are coupled all include rounded corners.

In at least one configuration, the first switch is disposed on the first side of the handle facing away from the operator and the second switch is disposed on an opposite side of the handle from the first switch and facing towards the operator.

In at least one configuration, the industrial machine tool is one of an industrial drill and an industrial riveter.

In at least one configuration, the second switch is actuated via a thumb of the operator and the first switch is actuated via at least one of an index finger, a middle finger, a ring finger, and a little finger of the operator.

In at least one configuration, the first switch is an elongated switch to be actuated by at least one of an index finger, a middle finger, a ring finger, and a little finger of the operator.

In at least one configuration, the machining process includes at least one of drilling, cutting, riveting, grinding, and shearing.

The disclosure is also directed to a method of operating an industrial machine tool via a handle coupled to the industrial machine tool. The method comprises actuating, via a first switch, a float mode for the industrial machine, the float mode being a mode in which movement of a moveable portion of the industrial machine tool is power assisted for an operator of the industrial machine tool. The method further comprises actuating, via a second switch, a machining portion coupled to the moveable portion of the industrial machine tool to perform a machining process on a workpiece. The handle of the method comprises the first switch, the second switch, and a housing including a first side, a second side, a top end, and a bottom end, the first side facing toward the industrial machine tool and the second side facing away from the industrial machine tool.

In at least one configuration of the method, the method further comprises power assisting, via a servomechanism, in the movement of the moveable portion of the industrial machine tool.

In at least one configuration of the method, the method further comprises sensing, via a distance sensor, a distance between the moveable portion of the industrial machine tool and the workpiece, and limiting, via a processor, the actuation of the machining portion to only when the distance between the moveable portion of the industrial machine tool and the workpiece is less than a threshold value.

In at least one configuration of the method, the first switch of the method is disposed on the first side of the handle facing away from the operator and the second switch is disposed on an opposite side of the handle from the first switch and facing towards the operator.

In at least one configuration of the method, the actuation of the method of the machining portion is actuated via a thumb of the operator and actuation of the float mode is actuated via at least one of an index finger, a middle finger, a ring finger, and a little finger of the operator.

In at least one configuration of the method, the machining process of the method includes at least one of drilling, cutting, riveting, grinding, and shearing.

In at least one configuration of the method, the industrial machine tool is a first industrial machine tool, the moveable portion is a first moveable portion, and the machining portion is a first machining portion. The method further comprises a second industrial machine tool including the handle, the method further comprises actuating, via the first switch, a float mode for a second moveable portion of the second industrial machine tool, and actuating, via the second switch, a second machining portion coupled to a second moveable portion of the second industrial machine tool to perform a second machining process of the second industrial machine tool on the workpiece.

In at least one configuration of the method, the first switch is an elongated switch to be actuated by at least one an index finger, a middle finger, a ring finger, and a little finger of the operator.

BRIEF DESCRIPTION OF THE DRAWINGS

The disclosure will now be described with reference to the drawings wherein.

DETAILED DESCRIPTION OF THE DISCLOSURE

Figure 1:
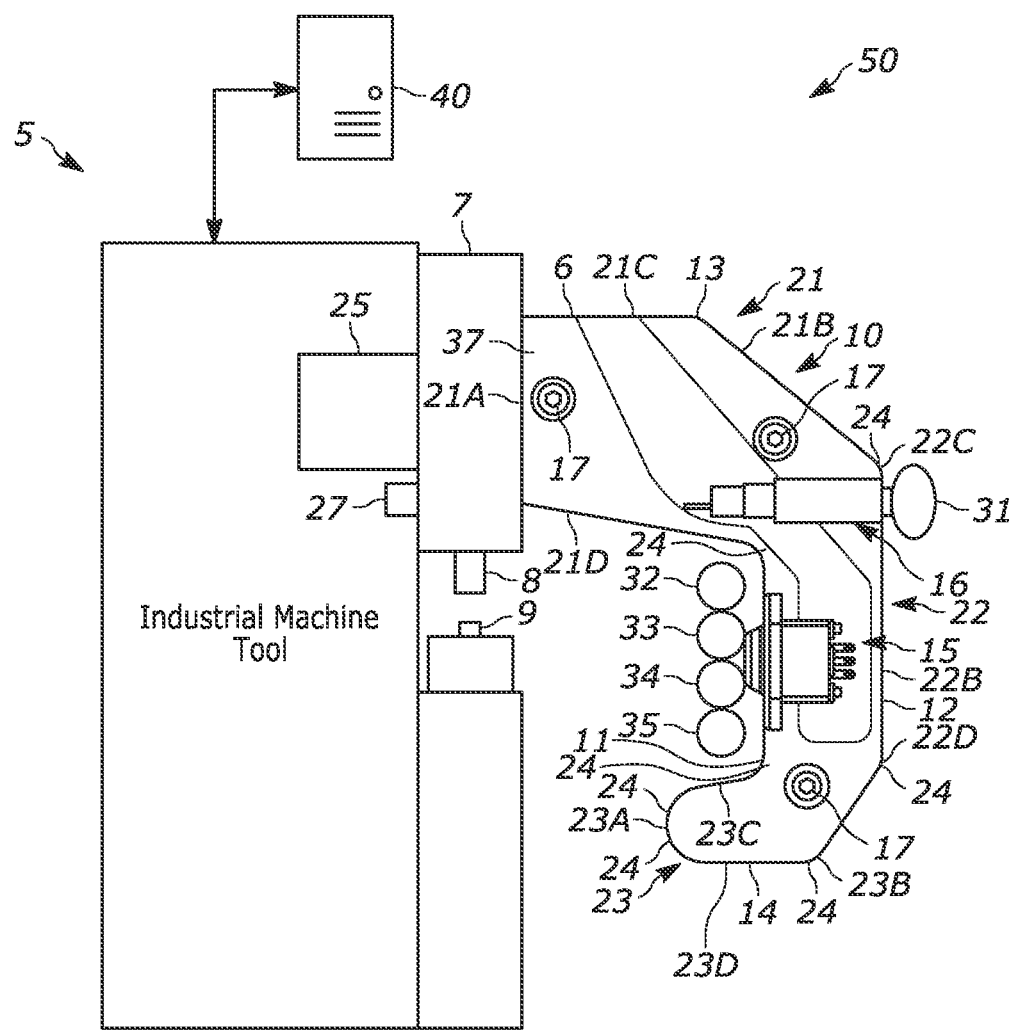
FIG. 1 illustrates a schematic view of a handle coupled to an industrial machine tool, in accordance with at least one configuration.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, an apparatus is disclosed, such as a handle 10 for an industrial machine tool 5. The handle 10 is shown out of proportion to the industrial machine tool 5 so as to better show details of the handle 10, with FIGS. 2-6 showing the handle 10 in an example real-world proportion. A system 50 can include both the handle 10 and the industrial machine tool 5. The handle 10 is coupled to the industrial machine tool 5, examples of which are shown in FIGS. 2-5 as an industrial drill 210 and an industrial riveter 220, discussed in more detail below. The handle 10 includes a housing 6 having a first side 11, a second side 12, a top end 13 and a bottom end 14. The first side 11 of the housing 10 faces toward the industrial machine tool 5 and the second side 12 of the housing 6 faces away from the industrial machine tool 5. In at least one configuration of the handle 10, the housing 6 is constructed from two halves (not shown) that are fastened together via fasteners 17.

In the example configuration of the housing 6 shown, the housing 6 includes a top portion 21, a middle portion 22, a bottom portion 23, which in at least one configuration can be integrated together to form a single integrated component. Locations where the top portion 21, the middle portion 22, and the bottom portion 23 are coupled can all include rounded corners 24 for comfort of first and second operators 201, 202 (FIGS. 2-5). The top portion 21 couples the handle 10 to the industrial machine tool 5, and specifically to a moveable portion 7 of the industrial machine tool 5. The top portion 21 includes a first side 21A, a second side 21B, a top side 21C, and a bottom side 21D. The first side 21A includes a substantially vertical edge 37 that contacts the moveable portion 7 and, in at least one configuration of the handle 10, the top side 21C also contacts the moveable portion 7, shown more clearly in FIGS. 5A and 5B. The top side 21C also tapers towards the middle portion 22, this taper on the top side 21D having an angle of approximately 45 degrees relative to horizontal. The top portion 21 also includes another taper on the bottom side 21D thereof. This taper is smaller than the taper on the top side 21C, having an angle of approximately 10 degrees relative to horizontal. This difference in tapers results in the top portion 21 being wider proximate to the first side 21A, e.g., where the housing 6 can couple to the moveable portion 7, than a width proximate to the second side 21B, this greater width being able to withstand pulling and pushing forces on the handle 10 by the first and second operators 201, 202.

The middle portion 22 also includes a first side 22A, a second side 22B, a top side 22C, and a bottom side 22D. The middle portion 22 is disposed substantially vertically between the top portion 21 and the bottom portion 23. The middle portion 22 is an elongated portion that extends from the top side 22C to the bottom side 22D. The middle portion 22 is substantially a constant width from the first side 22A to the second side 22B along a length of the middle portion 22 from the top side 22C to the bottom side 22D. The middle portion 22 is a portion of the handle 10 onto which the first and second operators 201, 202 can grasp the handle 10. For example, thumbs 31 of the first and second operators 201, 202, respectively, are disposed on the second side 22B of the middle portion 22, with at least one of a rest of the operators' fingers, that is at least one of an index finger 32, a middle finger 33, a ring finger 34, and a little finger 35 of the first and second operators 201, 202 being disposed on the first side 22A. Thus, the middle portion 22 is a location on the handle 10 where the operators 201, 202 grasps the handle 10 when using the industrial machining tool 5.

In the configuration of the handle 10 shown, the middle portion 22 is also the portion of the handle 10 that includes a first switch 15 (e.g., a push button switch) and a second switch 16 (e.g., a push button switch), although the first switch 15 and the second switch 16 can be disposed at other locations on the handle 10. In at least one configuration of the handle 10, the first switch 15 is disposed on the first side 11 of the handle 10, particularly the first side 22A of the middle portion 22, and the second switch 16 is disposed on the second side 12 of the handle 10, particularly the second side 22B of the middle portion 22. Thus, in the configuration shown the second switch 16 is disposed on an opposite side of the handle 10 from the first switch 15.

The bottom portion 23 likewise includes a first side 23A, a second side 23B, a top side 23C, and a bottom side 23D. The bottom portion 23 is disposed slightly oblique (e.g., −10 degrees off horizontal) with the middle portion 22, as shown. The bottom portion 23 is an elongated portion, shorter than both the middle portion 22 and the top portion 21, that extends from the first side 23A to the second side 23B. The bottom portion 23 slightly tapers from the second side 23B to the first side 23A. The bottom portion 23 is a portion of the handle 10 onto which the first and second operators 201, 202 can support the hands 203 of the first and second operators 201, 202, such as to rest their hands 203 onto the bottom portion 23 (e.g., particularly against their little fingers 35) while using the industrial machine tool 5. The bottom portion 23 also prevents the hands 203 of the first and second operators 201, 202 from sliding off of the handle 10 while operating the industrial machine tool 5, particularly when pulling down on the handle 10. The bottom portion 23 extends away from the first and second operators 201, 202 and toward the industrial machine tool 5.

Figure 2:
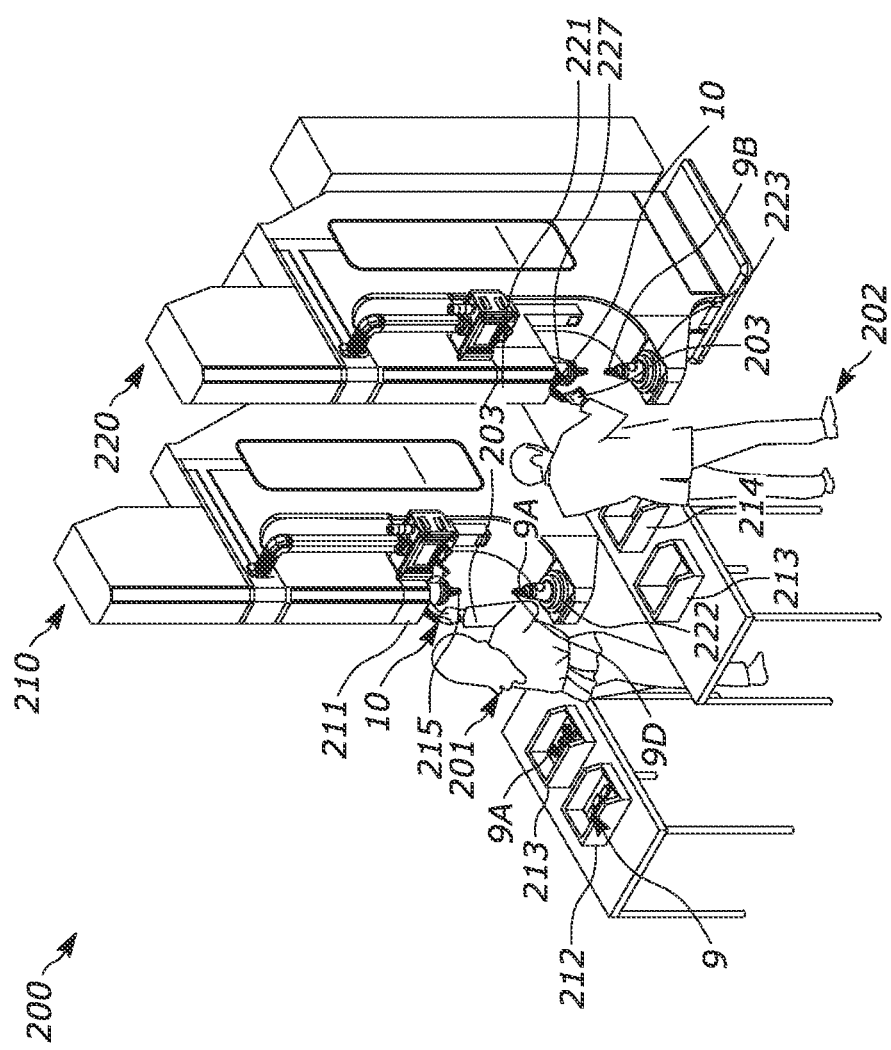
FIG. 2 illustrates an isometric view of a system including the handle coupled to two different types of industrial machine tools, an industrial drill and an industrial riveter, in accordance with at least one configuration.
Figure 3:
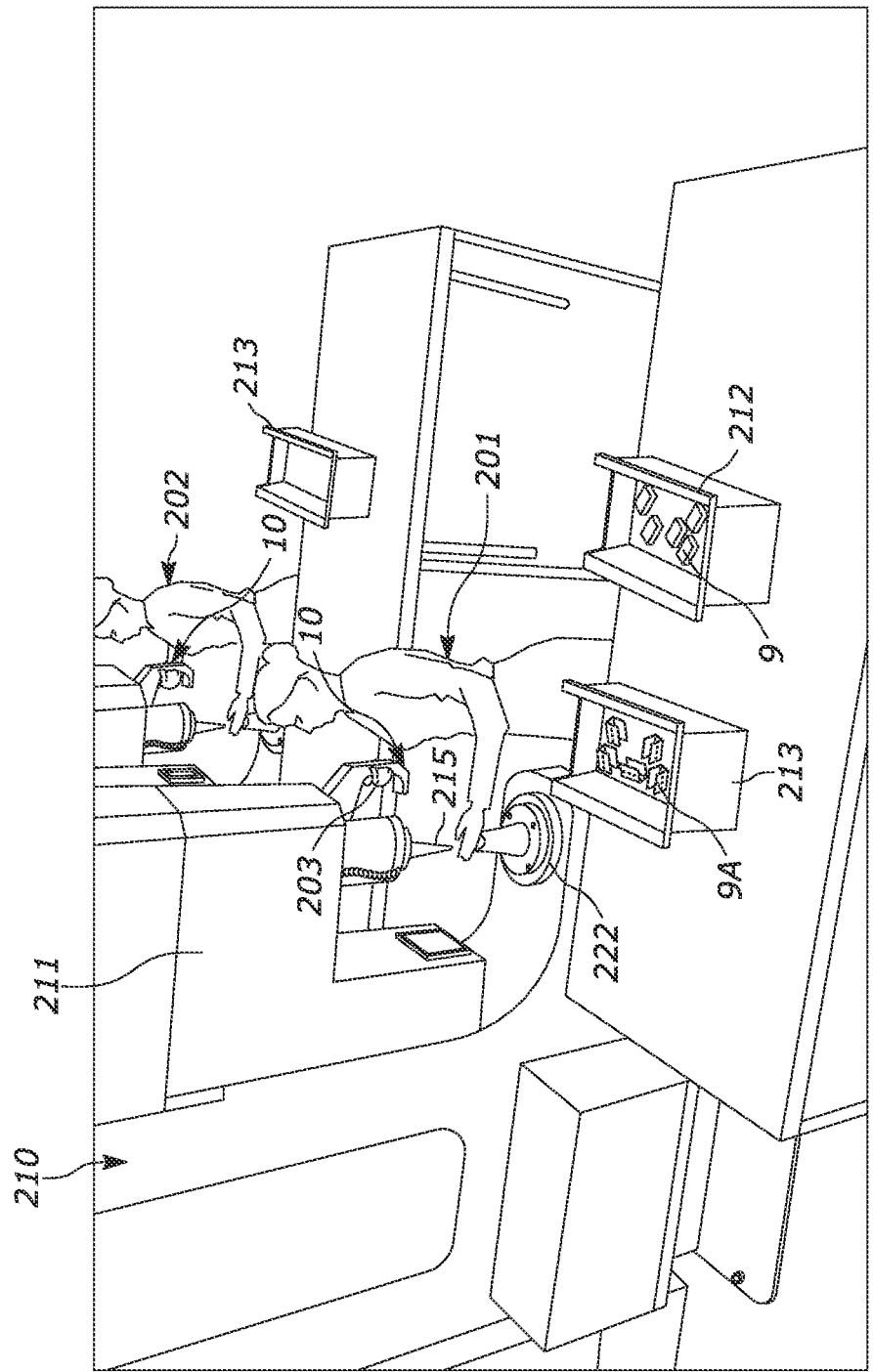
FIG. 3 illustrates an isometric closeup view of the industrial drill shown in FIG. 2, in accordance with at least one configuration.
Figure 4:
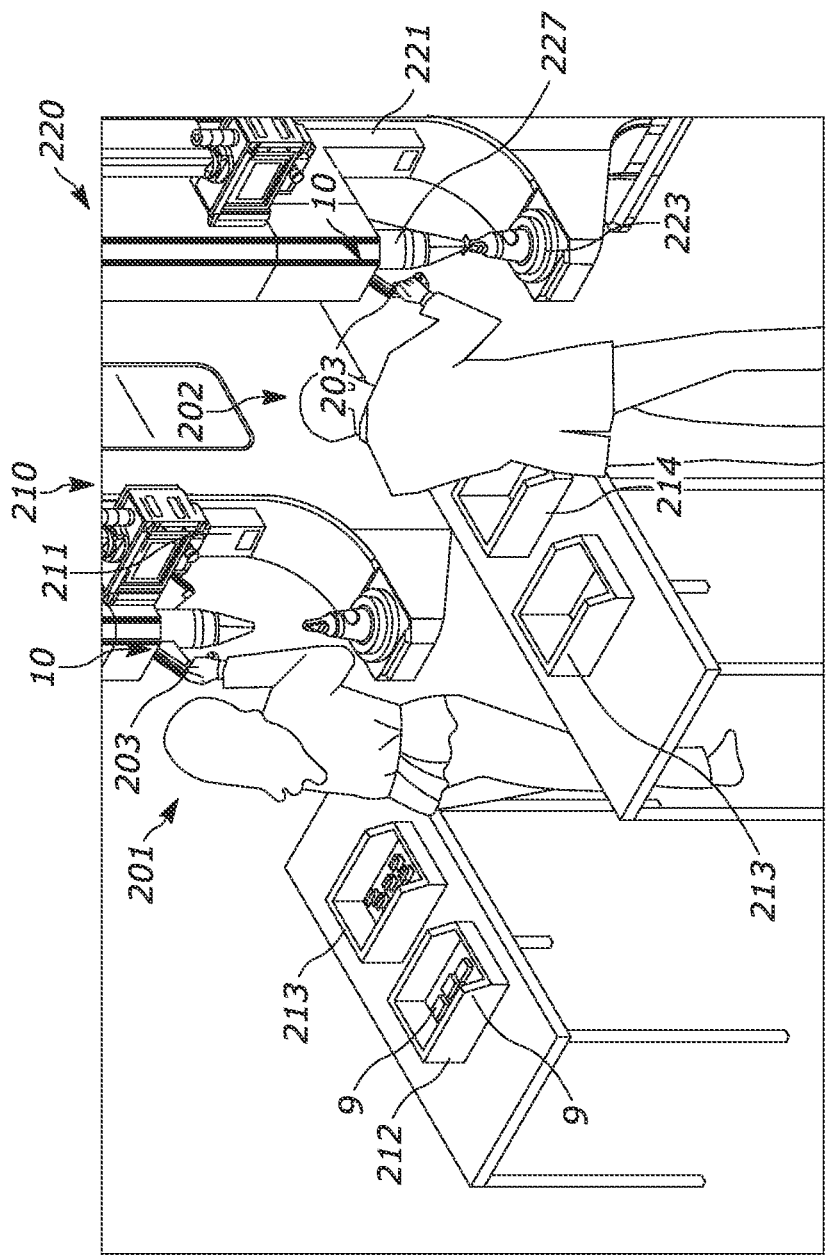
FIG. 4 illustrates an isometric closeup view of the industrial riveter shown in FIG. 2, in accordance with at least one configuration.

The first switch 15 can be disposed to face away from the first and second operators 201, 202 and the second switch 16 can be disposed to face the first and second operators 201, 202, as shown in FIGS. 2-4. In at least one configuration, the first switch 15 is an elongated switch to be actuated by one or more of a plurality of fingers of the first and second operators 201, 202 of the industrial machine tool 5. The first switch 15 is disposed approximately equidistant between the top side 22C and the bottom side 22D of the middle portion 22. This elongated shape and placement of the first switch 15 allows for variations in placement of the operators' hands 203, while still being able to actuate the first switch 15. The second switch 16 is a smaller switch (e.g., round in shape) that is located such that it will be actuated by thumbs 31 of the first and second operators 201, 202, respectively. The second switch 16 is disposed proximate to the top side 22C of the middle portion 22, proximate to where the top portion 21 is coupled to the middle portion 22.

To actuate a "float mode" for the industrial machine tool 5, the first and second operators 201, 202 can actuate the first switch 15. The float mode is a mode in which movement of a moveable portion 7 of the industrial machine tool 5 is power assisted. The moveable portion 7 of the industrial machine tool 5 can be heavy, such as when the moveable portion 7 includes an industrial motor and a heavy housing (among other components), for an operator (e.g., at least one of operators 201, 202 shown in FIG. 2) assigned to the industrial drill 210 and the industrial riveter 220, respectively) to move, e.g., down toward a workpiece 9. Should the first and second operators 201, 202 decide that the workpiece 9 is not ready for processing for whatever reason, the float mode also allows the first and second operators 201, 202 to move the moveable portion 7 upward away from the workpiece 9. The industrial machine tool 5 further includes a mechanism to power assist with moving the moveable portion 7 of the industrial machine tool 5. At least one configuration of the industrial machine tool 5 includes a servomechanism 25 to so assist in the movement of the moveable portion 7 of the industrial machine tool 5.

To actuate a "machine mode" for the industrial machine tool 5, the first and second operators 201, 202 can actuate the second switch 16. The machine mode is a mode in which the machining portion 8 of the industrial machine tool 5 performs its machining process, e.g., drilling, cutting, riveting, grinding, shearing, and/or other forms of machining. These machining processes can be manually controlled, or can be programmatically controlled, such as via an industrial machine controller 40. In this programmed mode, the industrial machine tool 5 performs a pre-programmed action (e.g., at specific locations, at specific depths, for specific times, etc.) to the workpiece 9 under control of the industrial machine controller 40 executing a software program.

Although the industrial machine controller 40 is illustrated as being disposed separate from the industrial machine tool 5, in at least one configuration the industrial machine controller 40 can be integrated with the industrial machine tool 5. In at least one configuration of the industrial machine tool 5, the industrial machine tool 5 further includes a distance sensor 27 (e.g., a linear variable differential transformer (LVDT)) to sense a distance between the moveable portion 7 of the industrial machine tool 5 and the workpiece 9. A processor 120 (FIG. 6) can limit the actuation of the industrial machine tool 5 to only when the distance, measured by distance sensor 27 between the moveable portion 7 of the industrial machine tool 5 and the workpiece 9 is less than a threshold value, such as when the distance between the moveable portion 7 of the industrial machine tool 5 and the workpiece 9 is such that first and second operators 201, 202 cannot fit their hands between the moveable portion 7 and the workpiece 9 to mitigate injury to the first and second operators 201, 202. Such limitation prevents the first and second operators 201, 202 from accidentally actuating the machining portion 8 when the machining portion is not proximate to the workpiece 9, potentially preventing injury to the first and second operators 201, 202.

FIG. 2 illustrates another system, system 200. The system 200 is comprised of an industrial drill 210 including the handle 10, and an industrial riveter 220 including the handle 10. Thus, in this specific example shown in FIGS. 2-5, the industrial drill 210 includes a moveable drilling portion 211 and the industrial riveter 220 includes a moveable riveting portion 221. In some scenarios, the same workpiece, such as workpiece 9, may need to be both drilled and riveted. In such scenarios, for convenience the industrial drill 210 is disposed next to the industrial riveter 220 such that the first and second operators 201, 202 can work as a team to produce a final product.

Figure 5A:
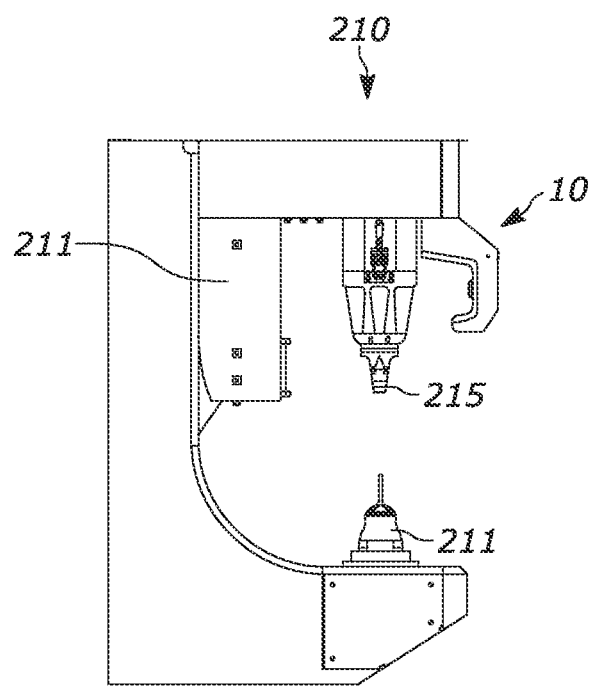
FIGS. 5A and 5B illustrate the industrial river shown in FIG. 2 with its moveable portion shown in its upmost position and with its moveable portion shown in its lowermost position, respectively, in accordance with at least one configuration.

During use of the system 200, the first operator 201 can pull non-drilled workpieces from a bin, such as a first bin 212. The first operator 201 would then place the non-drilled workpieces from the first bin 212 onto a support member 222 of industrial drill 210. The first operator 201 would then grasp the handle 10 of the industrial drill 210 and actuate via their hand 203 (e.g., one of an index finger 32, a middle finger 33, a ring finger 34, and a little finger 35) the first button 15, placing the industrial drill 210 in the float mode discussed above. FIG. 5A illustrates a typical position of the moveable portion 7, shown as the moveable drilling portion 211, of the industrial drill 210 when the operator 201 would first place the industrial drill 210 into the float mode. The first operator 201 can then move the moveable drilling portion 211 of the industrial drill 210 down toward the workpiece 9.

Figure 5B:
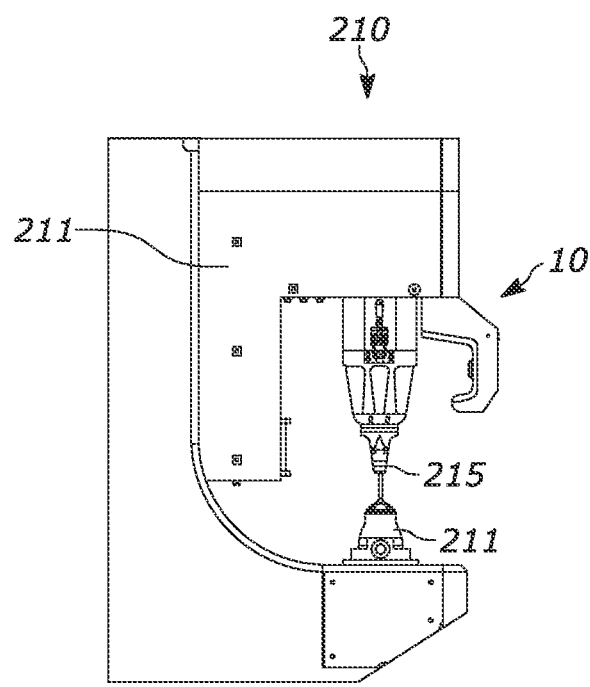

Once the industrial drill 210 determines that the moveable drilling portion 211 is within a pre-determine distance from the workpiece 9A, as discussed above, the industrial drill 210 takes over operation of the industrial drill 210 from the operator 201, clamps the workpiece 9 into place for drilling, and then actuates a drill 215 coupled to the moveable drilling portion 211 to drill a hole at least partially into the workpiece 9, then so drilled designated as workpiece 9A. If the workpiece 9 is to be riveted, as discussed below, the drill 215 would drill a hole entirely through the workpiece 9 to create an opening into which a rivet will be disposed. FIG. 5B illustrates a position of the moveable drilling portion 211 of the industrial drill 210 at a time when the industrial drill 210 takes over operation of the moveable drilling portion 211 from the operator 201, such as to automatically perform drilling on the workpiece 9. The industrial drill 210 can then move, such as via the servomechanism 25, either automatically or manually by the first operator 201 the moveable drilling portion 211 upward away from the workpiece 9A. The first operator 201 can then remove the workpiece 9A from the industrial drill 210 and place post-drilled versions of the workpiece 9A into another bin, a second bin 213. The first operator 201 can then pass the second bin 213 including the post-drilled versions of the workpiece 9A to the second operator 202. The operator 201 can repeat this process for as many of the workpieces 9A are needed.

The second operator 202 can then pull the post-drilled versions of workpiece 9A from the second bin 213 for riveting by the industrial riveter 220. The second operator 202 can pull the post-drilled versions of the workpiece 9A from the second bin 213 and place the post-drilled versions of the workpiece 9A onto a support member 223 of the industrial riveter 220. Then, similar to how the first operator 201 actuates the industrial drill 210 to drill non-drilled versions of the workpiece 9, the second operator 201 can actuate the industrial riveter 220 to rivet the drilled version of the workpiece 9A. The second operator 202 would then grasp the handle 10 of the industrial riveter 220 and actuate via their hand 203 (e.g., one of an index finger 32, a middle finger 33, a ring finger 34, and a little finger 35) the first button 15, placing the industrial riveter 220 in the float mode discussed above. The second operator 202 can then move the moveable riveting portion 221 of the industrial riveter 220 down toward the workpiece 9A.

Once the industrial riveter 220 determines that the moveable riveting portion 221 is within a pre-determine distance from the workpiece 9A, the industrial riveter 220 can take over operation of the industrial riveter 220 from the operator 202, clamp the workpiece 9A into place for riveting, and actuate a riveting mechanism 227 coupled to the moveable riveting portion 221 to rivet a component (not shown) onto the workpiece 9A. The industrial riveter 220 can then move, such as via the servomechanism 25, either automatically or manually by the second operator 202 the moveable riveting portion 221 upward to a "home" location away from the workpiece 9B that now also includes rivets (not shown), designating the riveted workpiece as workpiece 9B. This home location puts the moveable riveting portion 221 at a location in which the industrial riveter 220 is ready to perform riveting on a next workpiece. The second operator 202 can then remove the workpiece 9B from the industrial riveter 220 and place post-riveted versions of the workpiece 9B into another bin, a third bin 214. The operator 202 can repeat this process for as many of the workpieces 9B are needed.

Thus, as can be appreciated by one skilled in the art, because the same handle 10 is used for both the industrial drill 210 and the industrial riveter 220, and the handle 10 operates the industrial drill 210 and the industrial riveter 220 in a substantially same manner, the first and second operators 201, 202 can more easily move between the industrial drill 210 and the industrial riveter 220. This easy of movement between such machine tools simplifies cross-training within a factory including such machinery.

Figure 6:
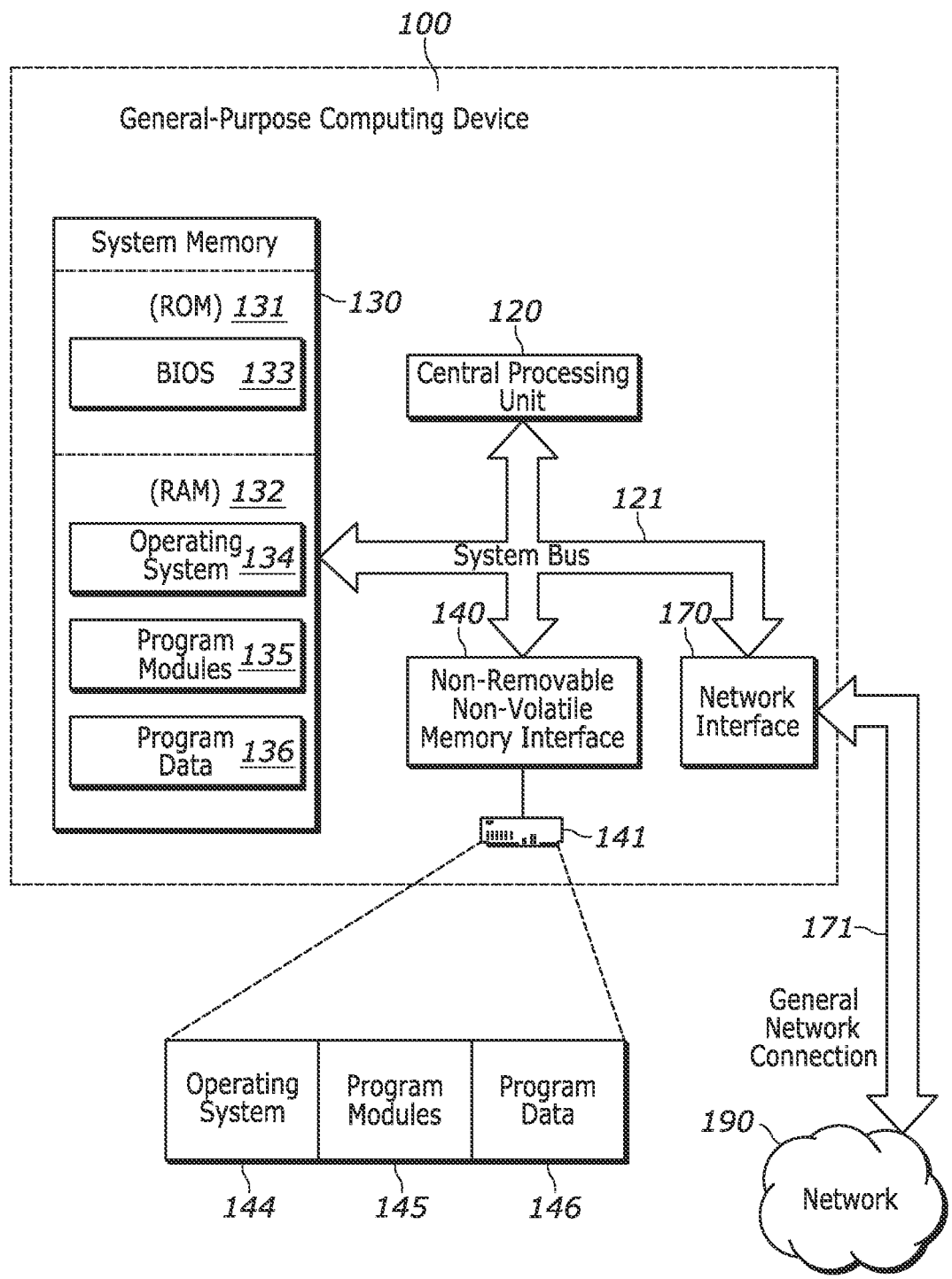
FIG. 6 illustrates an example schematic representation of a general-purpose computing device, a version of which may comprise the industrial machine controller illustrated in FIG. 1, in accordance with at least one configuration.

With reference to FIG. 6, an exemplary general-purpose computing device is illustrated in the form of the exemplary general-purpose computing device 100. The general-purpose computing device 100 may be of the type utilized for the industrial machine controller 40 (FIG. 1) as well as the other computing devices with which industrial machine controller 40 may communicate through an outside communication network, such as network 190. As such, it will be described with the understanding that variations can be made thereto. The exemplary general-purpose computing device 100 can include, but is not limited to, one or more central processing units (CPUs) 120, a system memory 130, such as including a Read Only Memory (ROM) 131 to store a Basic Input/Output System (BIOS) 133 and a Random Access Memory (RAM) 132, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and other components of the general-purpose computing device 100 can be physically co-located, such as on a single chip. In such a case, some or all of the system bus 121 can be nothing more than communicational pathways within a single chip structure and its illustration in FIG. 6 can be nothing more than notational convenience for the purpose of illustration.

The general-purpose computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 100 may operate in a networked environment via logical connections to one or more remote computers. The logical connection depicted in FIG. 6 is a general network connection 171 to a network 190, which can be a local area network (LAN), a wide area network (WAN) such as the Internet, or other networks. The computing device 100 is connected to the general network connection 171 through a network interface or adapter 170 that is, in turn, connected to the system bus 121. In a networked environment, program modules depicted relative to the general-purpose computing device 100, or portions or peripherals thereof, may be stored in the memory of one or more other computing devices that are communicatively coupled to the general-purpose computing device 100 through the general network connection 171. It will be appreciated that the network connections shown are exemplary and other means of establishing a communications link between computing devices may be used.

The general-purpose computing device 100 may also include other removable/non-removable, volatile/nonvolatile computer storage media. By way of example only, FIG. 6 illustrates a hard disk drive 141 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 6, provide storage of computer readable instructions, data structures, program modules and other data for the general-purpose computing device 100. In FIG. 6, for example, hard disk drive 141 is illustrated as storing operating system 144, other program modules 145, and program data 146. Note that these components can either be the same as or different from operating system 134, other program modules 135 and program data 136, stored in RAM 132. Operating system 144, other program modules 145 and program data 146 are given different numbers here to illustrate that, at a minimum, they are different copies.

With reference to FIG. 1, again, the foregoing description applies to the industrial machine controller 40, as well as to any other computing devices in communication with the industrial machine controller 40 through the network 190. The network interface 170 facilitates outside communication in the form of voice and/or data. For example, the communication module may include a connection to a Plain Old Telephone Service (POTS) line, or a Voice-over-Internet Protocol (VOIP) line for voice communication. In addition, the network interface 170 may be configured to couple into an existing network, through wireless protocols (Bluetooth, 802.11a, ac, b, g, n, or the like) or through wired (Ethernet, or the like) connections, or through other more generic network connections. In still other configurations, a cellular link can be provided for both voice and data (i.e., GSM, CDMA or other, utilizing 2G, 3G, and/or 4G data structures and the like). The network interface 170 is not limited to any particular protocol or type of communication. It is, however, preferred that the network interface 170 be configured to transmit data bi-directionally, through at least one mode of communication. The more robust the structure of communication, the more manners in which to avoid a failure or a sabotage with respect to communication, such as to collect healthcare information in a timely manner.

The program modules 145 comprises a user interface which can configure the industrial machine tool 5. In many instances, the program modules 145 can facilitate a keypad with a display that is connected through a wired connection with the industrial machine controller 40. Of course, with the different communication protocols associated with the network interface 170, the program modules 145 may facilitate a wireless device that communicates with the industrial machine controller 40 through a wireless communication protocol (i.e., Bluetooth, RF, WIFI, etc.). In other embodiments, the program modules 145 may comprise a virtual programming module in the form of software that is on, for example, a smartphone, in communication with the network interface 170. In still other embodiments, such a virtual programming module may be located in the cloud (or web based), with access thereto through any number of different computing devices. Advantageously, with such a configuration, a user may be able to communicate with the industrial machine tool 5 remotely, with the ability to change functionality.

Significantly, with the connectivity of the present industrial machine controller 40 through the network interface 170, substantial additional and unique functionality can be provided. For example, the industrial machine tool 5 can be placed into communication with a database (not shown) that includes machining programs for the industrial machine tool 5.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A method of operating an industrial machine tool via a handle coupled to the industrial machine tool, the method comprising:
   actuating, via a first switch, a float mode for the industrial machine, the float mode being a mode in which movement of a moveable portion of the industrial machine tool is power assisted for an operator of the industrial machine tool;
   actuating, via a second switch, a machining portion coupled to the moveable portion of the industrial machine tool to perform a machining process on a workpiece;
   wherein the handle comprises:
      the first switch;
      the second switch; and
      a housing including a first side, a second side, a top end, and a bottom end, the first side facing toward the industrial machine tool and the second side facing away from the industrial machine tool.

2. The method according to claim 1, further comprising power assisting, via a servomechanism, in the movement of the moveable portion of the industrial machine tool.

3. The method according to claim 1, further comprising:
   sensing, via a distance sensor, a distance between the moveable portion of the industrial machine tool and the workpiece; and
   limiting, via a processor, the actuation of the machining portion to only when the distance between the moveable portion of the industrial machine tool and the workpiece is less than a threshold value.

4. The method according to claim 1, wherein the first switch is disposed on the first side of the handle facing away from the operator and the second switch is disposed on an opposite side of the handle from the first switch and facing towards the operator.

5. The method according to claim 1, wherein the actuation of the machining portion is actuated via a thumb of the operator and actuation of the float mode is actuated via at least one of an index finger, a middle finger, a ring finger, and a little finger of the operator.

6. The method according to claim 1, wherein the machining process includes at least one of drilling, cutting, riveting, grinding, and shearing.

7. The method according to claim 1, wherein the industrial machine tool is a first industrial machine tool, the moveable portion is a first moveable portion, and the machining portion is a first machining portion, the method further comprising a second industrial machine tool including the handle, the method further comprising:

actuating, via the first switch, a float mode for a second moveable portion of the second industrial machine tool; and actuating, via the second switch, a second machining portion coupled to a second moveable portion of the second industrial machine tool to perform a second machining process of the second industrial machine tool on the workpiece.

8. The method according to claim 1, wherein the first switch is an elongated switch to be actuated by at least one an index finger, a middle finger, a ring finger, and a little finger of the operator.

\* \* \* \* \*